United States Patent [19]
Cox et al.

[11] Patent Number: 5,437,720
[45] Date of Patent: Aug. 1, 1995

[54] SPHEROIDAL AGGREGATE OF PLATY SYNTHETIC HYDROTALCITE

[75] Inventors: Sherman D. Cox, Allentown; Kenneth J. Wise, Schnecksville, both of Pa.

[73] Assignee: Minerals Technologies Inc., New York, N.Y.

[21] Appl. No.: 251,412

[22] Filed: May 31, 1994

Related U.S. Application Data

[62] Division of Ser. No. 964,338, Oct. 21, 1992, Pat. No. 5,364,828.

[51] Int. Cl.$^6$ ............................................. C04B 14/26
[52] U.S. Cl. ................................. 106/415; 106/463; 106/903; 423/430; 423/419.1
[58] Field of Search ................. 106/415, 463, 903; 502/80; 423/430, 415, 419 R

[56] References Cited

U.S. PATENT DOCUMENTS

| | | | |
|---|---|---|---|
| 3,539,306 | 11/1970 | Kumura et al. | 423/432 |
| 4,656,156 | 4/1987 | Misra | 502/415 |
| 4,774,212 | 9/1988 | Drezdon | 502/80 |
| 4,883,533 | 11/1989 | Kosin et al. | 106/415 |
| 4,904,457 | 2/1990 | Misra | 423/115 |

FOREIGN PATENT DOCUMENTS 62-290765 12/1987 Japan.

*Primary Examiner*—Mark L. Bell
*Assistant Examiner*—Michael Marcheschi

[57] ABSTRACT

An aggregated synthetic hydrotalcite having a substantially spheroidal shape and an average diameter of up to about 60 μm is disclosed. The aggregates are composed of individual platy particles having plate diameters of from about 0.05 to about 10 μm. The material has a low tapped density, a high pore volume and a high specific surface area. A process for producing the product is also disclosed. Product particle size is determined by controlling process parameters including reaction temperature and pH, stirring speed of the reaction mixture, and reactant addition rates and concentrations, including aqueous solutions of soluble magnesium and aluminum salts, which are mixed in a molar ratio of from about 2.5:1 to 4:1, and a basic solution containing excess carbonate and base to maintain the reaction mixture at a pH of from about 8.5 to about 9.5.

2 Claims, 6 Drawing Sheets

SPHEROIDAL AGGREGATE OF PLATY SYNTHETIC HYDROTALCITE

This is a divisional of application Ser. No. 07/964,338, filed Oct. 21, 1992 now U.S. Pat. No. 5,364,828.

FIELD OF THE INVENTION

This invention relates to synthetic hydrotalcite having a novel morphology of porous spheroidal aggregates composed of thin platy particles, a process for its preparation, and to methods of its use, in particular, as a low density filler in paper, plastics and ceramics.

BACKGROUND OF THE INVENTION

Naturally occurring hydrotalcite is a mineral found in relatively small quantities in a limited number of geographical areas, principally, in Norway and in the Ural Mountains. Known deposits of the material total only about 2,000 to 3,000 tons worldwide. Natural hydrotalcite has a variable composition depending on the location of the source. Natural hydrotalcite is a hydrated magnesium, aluminum and carbonate-containing composition, which has been found to have the typical composition, represented alternatively as: $6MgO.Al_2O_3.CO_2.12H_2O$ and $Mg_6Al_2(OH)_{16}CO_3.4H_2O$. Natural hydrotalcite deposits are generally found intermeshed with spinel and other materials due to the existence of non-equilibrium conditions during formation of the deposits. Other minerals such as penninite and muscovite, and heavy metals are also found in natural hydrotalcite deposits. There are no presently known techniques for separating these materials and purifying the natural hydrotalcite.

Synthetically produced hydrotalcite can be made to have the same composition as natural hydrotalcite, or, because of flexibility in the synthesis, it can be made to have a different composition by replacing the carbonate anion with other anions, such as phosphate ion.

A phosphate-modified synthetic hydrotalcite and a process for its synthesis is disclosed in U.S. Pat. No. 4,883,533 to Kosin et al. for "Modified Synthetic Hydrotalcite." The hydrotalcite disclosed there is of the general formula $xMgO.Al_2O_3yPO_4.zH_2O$ wherein x, y and z are integers representing the number of moles of each component, and wherein x is from 2.5 to 4.5, y is from 1.0 to 2.0 and z is from 7.0 to 10.0, with the hydrotalcite having a platelet particle morphology and an average particle size of less than about 1 micron.

U.S. Pat. No. 3,539,306 to Kumura et al. for "Process for the Preparation of Hydrotalcite" discloses a process for preparing hydrotalcite which involves mixing an aluminum-containing compound with a magnesium-containing compound in an aqueous medium in the presence of carbonate ion at a pH of at least 8.

U.S. Pat. No. 4,656,156 to Misra for "Absorbent and Substrate Products and Method of Producing Same" discloses a process for producing synthetic hydrotalcite, which is subsequently mixed with activated alumina to form absorbent and substrate compositions. The process for producing synthetic hydrotalcite involves the steps of forming activated magnesia by heating a magnesium compound to a temperature of from about 500° to 900° C., then adding the activated magnesia to an aqueous solution containing aluminate, carbonate and hydroxyl ions, such as industrial Bayer process liquor, and agitating at a temperature of about 80°–100° C. for 20–120 minutes to form a low density, high porosity hydrotalcite.

A method for producing hydrotalcite from activated magnesia by reacting it with an aqueous solution containing aluminate, carbonate and hydroxyl ions is disclosed in U.S. Pat. No. 4,904,457 to Misra for "Synthetic Hydrotalcite". The method includes a first step of heating magnesium carbonate or magnesium hydroxide to a temperature between 500°–900° C. to form activated magnesia. The hydrotalcite produced by this process is the same as that disclosed in U.S. Pat. No. 4,656,156.

Hydrotalcite compositions containing pillaring organic, inorganic and mixed organic/inorganic anions are disclosed in U.S. Pat. No. 4,774,212 to Drezdon for "Pillared Hydrotalcites". The compositions are anionic magnesium aluminum hydrotalcite clays having large inorganic and/or organic anions located interstitially between positively charged layers of metal hydroxides. The compositions are of the formula

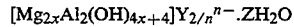

$$[Mg_{2x}Al_2(OH)_{4x+4}]Y_{2/n}{}^{n-}.ZH_2O$$

where Y is a large organic anion selected from the group consisting of lauryl sulfate, p-toluenesulfonate, terephthalate, 2,5-dihydroxy-1,4-benzenedisulfonate, and 1,5 naphthalenedisulfonate or where it is an anionic polyoxometalate of vanadium, tungsten or molybdenum. In the above cases, x is from 1.5 to 2.5, n is 1 or 2 and Z is from 0 to 3, except that when Y is polyoxometalate, n is 6.

Synthetic hydrotalcite produced according to all previous methods has been known to have either a plate-like or a needle-like morphology and is unaggregated or forms irregularly shaped aggregates of broad aggregate size distribution. It has heretofore been unknown in the art to produce an aggregated hydrotalcite having a substantially uniform shape and an aggregate particle size which is uniform, and which can be controlled over a wide range of sizes, having a narrow aggregate particle size distribution.

We have discovered that, surprisingly, aggregates of synthetic platy hydrotalcite, having substantially uniformly spheroidal shapes, with relatively narrow aggregate size distribution, low specific density, high surface area, and high porosity can be made by carefully controlling a number of reaction parameters in the synthesis of the hydrotalcite. The ability to synthesize such a form of hydrotalcite makes the material of the present invention suitable for a large number of diverse applications for which needle-like hydrotalcite, unaggregated platy hydrotalcite, and irregularly shaped aggregated hydrotalcite are deemed unsuitable, or are non-optimal.

SUMMARY OF THE INVENTION

According to the present invention, a broad size range of substantially spheroidal hydrotalcite aggregates can be synthesized, having average spherical diameters of up to about 60 μm. Individual hydrotalcite particles within the aggregates are substantially platy in nature, while the aggregates themselves are substantially uniformly spheroidal in shape.

The hydrotalcite compositions are prepared from aqueous solutions of soluble magnesium and aluminum salts, which are mixed in a molar ratio of from about 2.5:1 to 4:1, together with a basic solution containing at least a two-fold excess of carbonate and a sufficient amount of a base to maintain a pH of the reaction mixture in the range of from about 8.5 to about 9.5.

The product particle size is determined by controlling process parameters including reaction temperature, reaction stirring speed, reaction pH, reactant addition rates and reactant concentrations.

The combination of properties exhibited by the spheroidal aggregates of this invention enable them to be used in a wide variety of applications. Such uses include, but are not limited to: specialty fillers in plastics, paints, ceramics and paper; catalysts and catalyst carriers; chromatography media; adsorbents; and carriers for fragrances, flavors and pesticides.

DETAILED DESCRIPTION OF THE INVENTION

Figure 1:
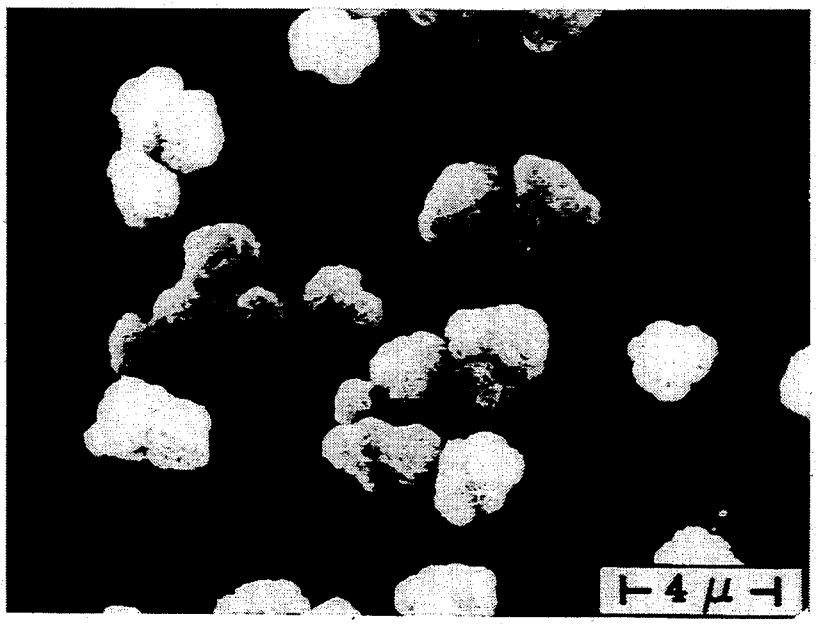
FIG. 1 is a SEM photomicrograph of the product of Example 1 at 5000 times magnification.
Figure 2:
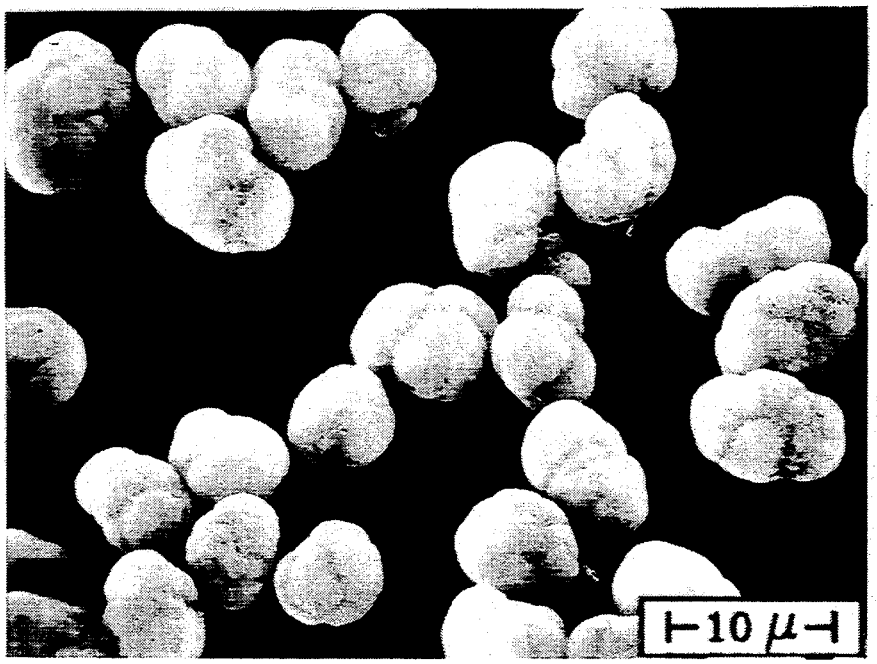
FIG. 2 is a SEM photomicrograph of the product of Example 2 at 2000 times magnification.
Figure 3A:
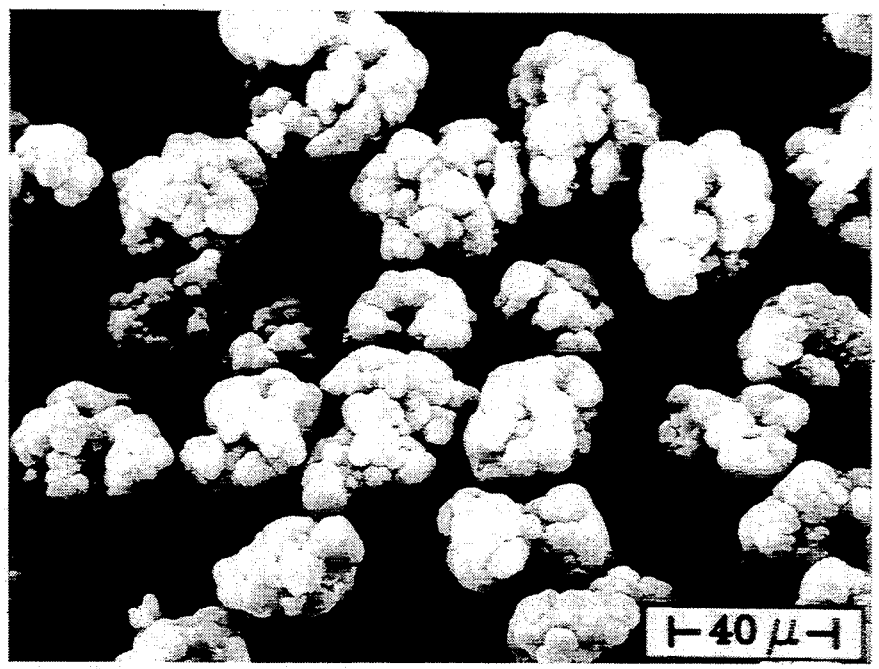
FIGS. 3A and 3B are, respectively, SEM photomicrographs of the product of Example 3 at 500 and 5000 times magnification.
Figure 3B:
Figure 4A:
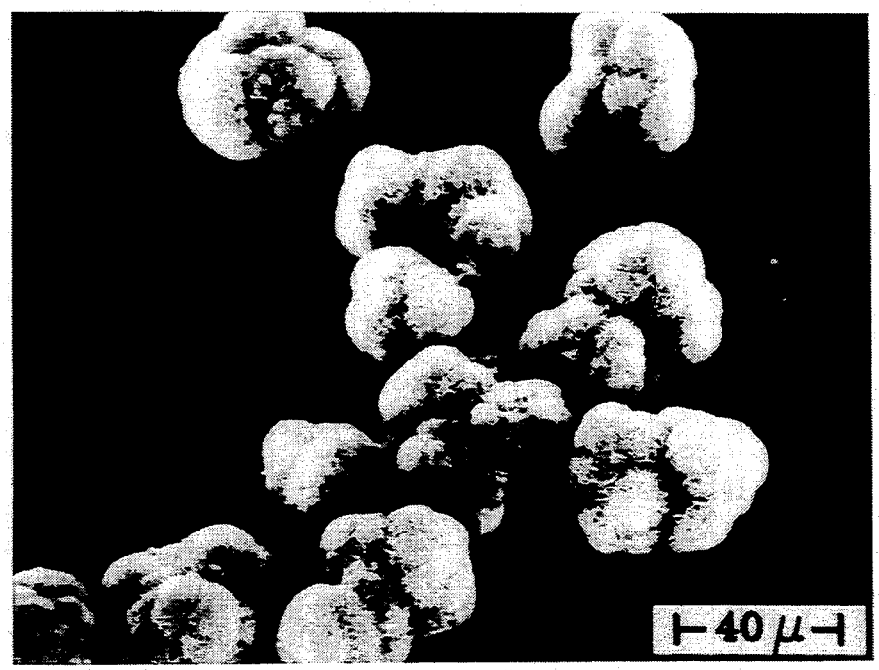
FIGS. 4A and 4B are, respectively, SEM photomicrograph of the product of Example 5 at 500 and 2000 times magnification.
Figure 4B:
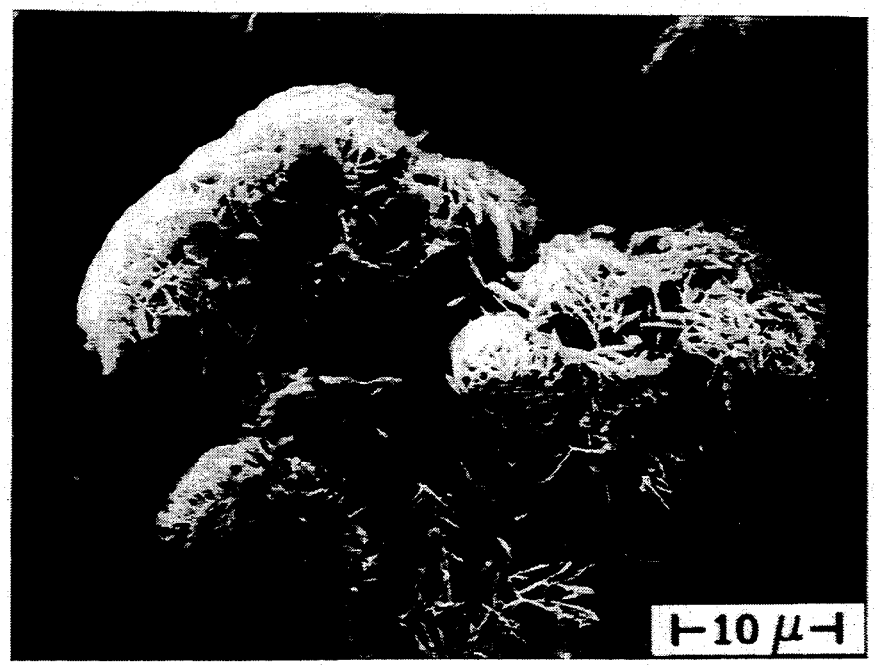
Figure 5A:
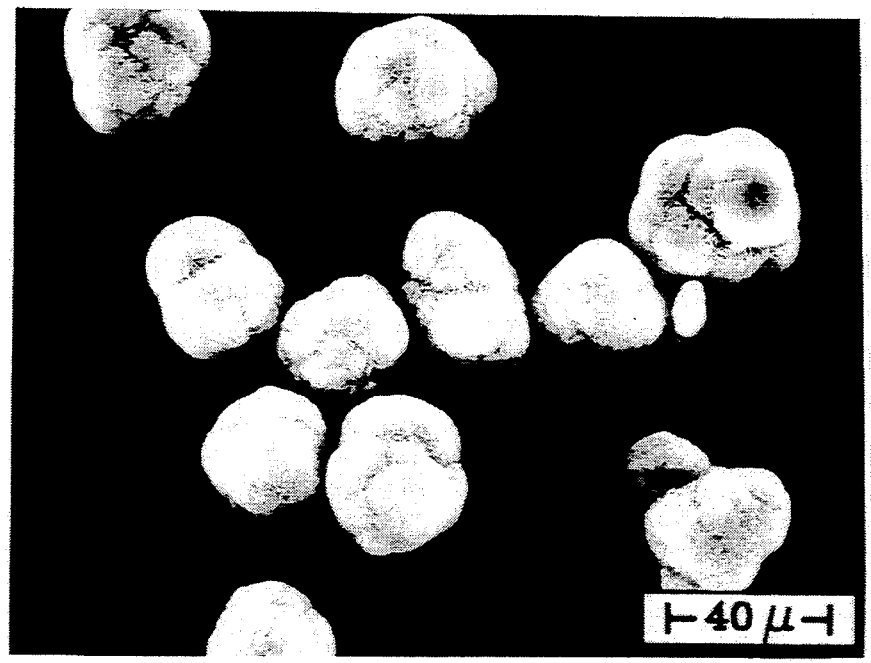
FIGS. 5A and 5B are, respectively, SEM photomicrographs of the product of Example 7 at 500 and 2000 times magnification.
Figure 5B:
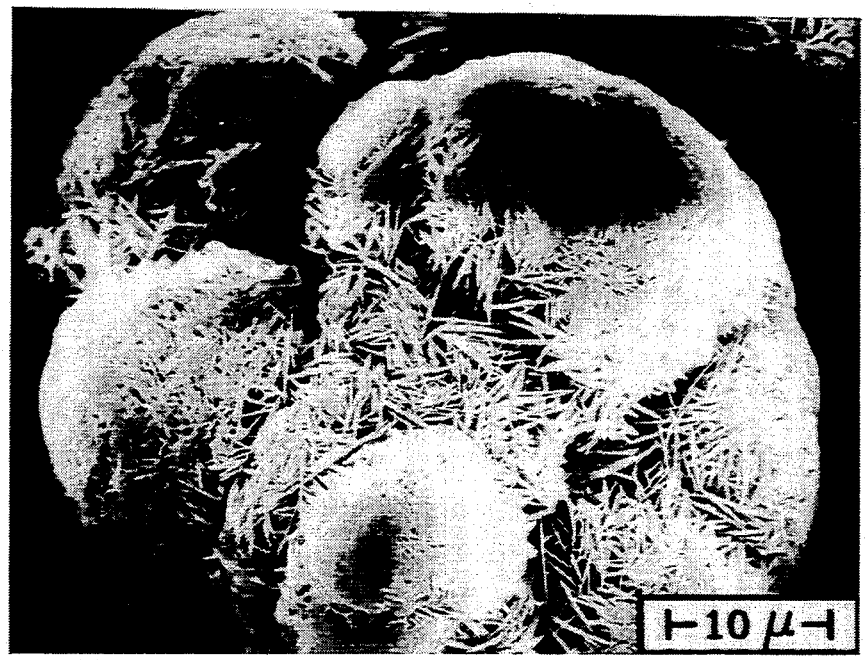
Figure 6A:
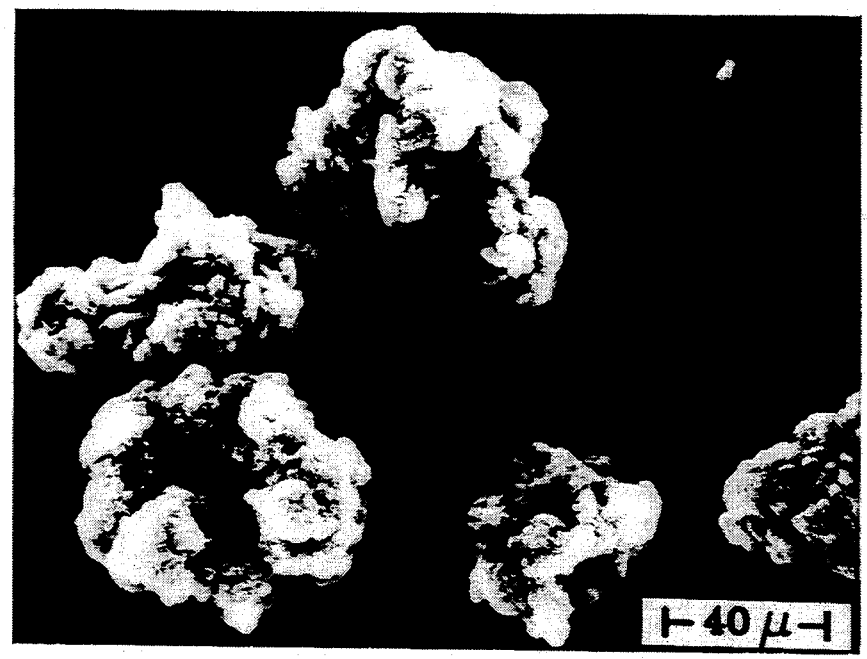
FIGS. 6A and 6B are, respectively, SEM photomicrographs of the product of Example 8 at 500 and 2000 times magnification.
Figure 6B:
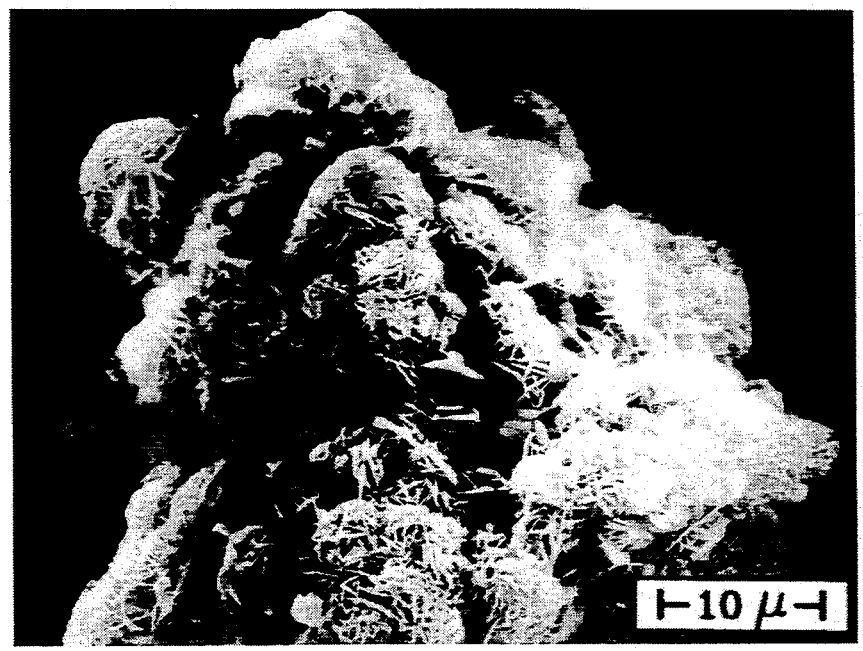
Figure 7A:
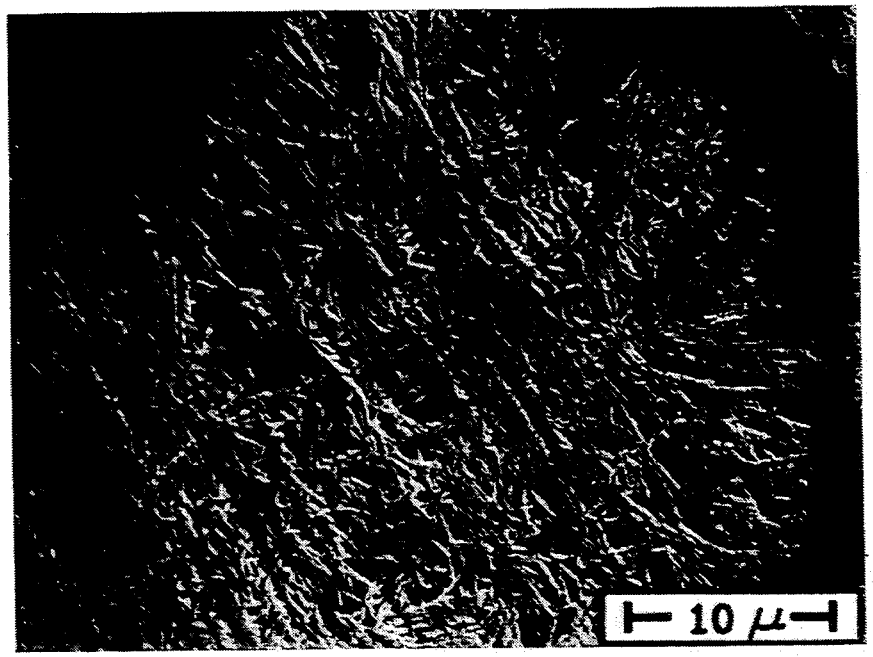
FIGS. 7A and 7B are, respectively, cross-sectional SEM photomicrographs of a hydrotalcite aggregate according to the present invention at 2400 and 4800 times magnification.
Figure 7B:
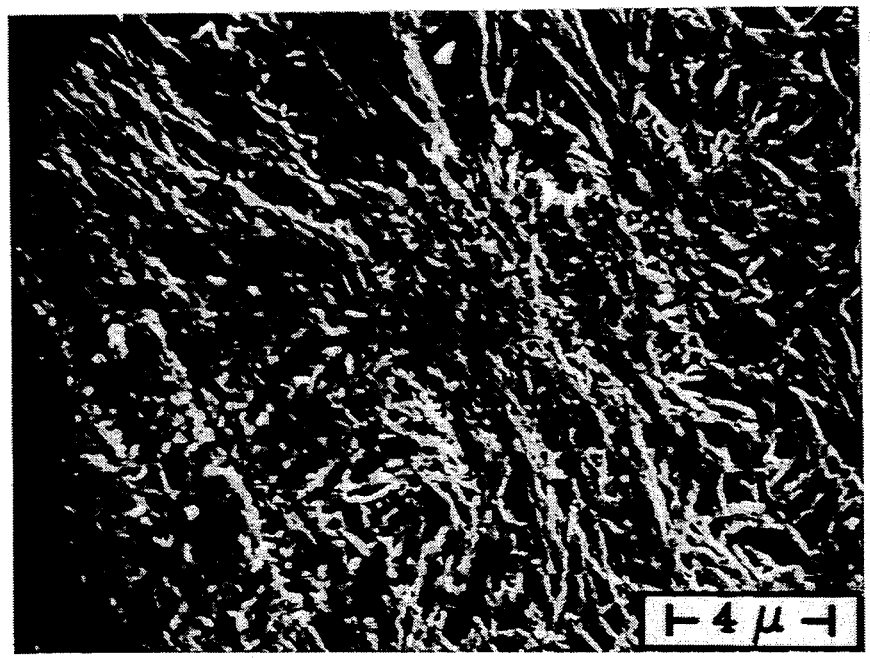

Synthetic hydrotalcite produced according to the present invention is of the general formula I:

$$Mg_wAl_2(OH)_x \cdot 4 \cdot yCO_3 \cdot zH_2O$$

wherein w is from about 5 to about 8;
x is from about 14 to about 20;
y is from 0.5 to about 2; and
z is from about 2 to about 6.

In a preferred hydrotalcite according to the present invention, the reactants and reaction conditions are selected to form a product wherein w is 6; x is 16; y is 1; and z is 4.

The composition of the reagent mixtures used to produce hydrotalcite according to the present invention are of the general formulae II-V $$wMgX_2: 2AlX_3:(2+z)Na_2CO_3:(15-z)NaOH: 300-3000H_2O \quad (II)$$

or $$wMgY:Al_2Y_3: (2+z)Na_2CO_3: (15-z)NaOH: 300-3000H_2O \quad (III)$$

or $$wMgX_2: 2NaAlO_2: (2+z')Na_2CO_3: (9-z')NaOH: 300-3000H_2O \quad (IV)$$

or $$wMgY: 2NaAlO_2: (2+z')Na_2CO_3: (9-z')NaOH: 300-3000H_2O \quad (V)$$

where
X is Cl−, NO3− or other mono-anions of soluble Mg and Al salts,
Y is SO4−2 or other di-anions of soluble Mg and Al salts,
w is from about 4.5 to about 9
z is an integer from 0 to 15, and
z' is an integer from 0 to 9.

The compositions of the present invention, as disclosed herein, are prepared from aqueous solutions of magnesium and aluminum ions, preferably, as separate solutions of magnesium ions and sodium aluminate, which are mixed in a molar ratio of from about 4:1 to 2.5:1, preferably about 3:1; a basic solution containing carbonate, in an excess of the amount required by the hydrotalcite stoichiometry, preferably 2-fold or more; and enough of a base, such as sodium hydroxide, to maintain the pH of the reaction mixture in the range of from about 8.5 to 9.5, preferably from about 8.8 to 9.2.

The reaction is carried out by adding reactant solutions to a volume of water at a temperature of from about 20° C. to the solution boiling point, preferably from about 80°–100° C., over a period of from about 0.5 to 8.0 hours, preferably from about 2.0 to 4.0 hours, with stirring, generally keeping the temperature, addition rates and stirring rate constant, although the addition of one or more reactants may be initially delayed or temporarily interrupted for a time during the addition process. The water to which the reactant solutions are added may be deionized water, tap water or recycled filtrate in a volume of from about ¼ to ¾ of the final volume. The reaction mixture is stirred at a rate sufficient to insure homogeneous mixing and to apply the necessary shearing force to the reaction mixture. The concentration of the product in the final reaction slurry is in the range of from about 1 to about 10 weight percent. As the reaction proceeds, product is formed in a suspension. The suspended product is aged for a period of time of from about 5 to 1200 minutes, preferably, from about 10–15 minutes, at the reaction temperature.

Alternatively, the reactant solutions are prepared using alcohol or mixed aqueous-alcohol solvents, rather than as aqueous solutions.

One important aspect of the present invention is the range of aggregate particle sizes which can be produced, up to about 60 μm. Aggregate product size is determined by controlling a number of process parameters including reaction temperature, reactant stirring speed, reaction pH, reactant addition rates and reactant concentrations. Agitation rate and type of agitation have the largest effect on aggregate size. Stirring at faster speeds (at high shear) gives smaller aggregates while stirring slowly with a large flat blade (low shear but thorough mixing) produces the largest possible aggregates. Inadequate mixing produces small plates aggregated in a very irregular and nearly continuous manner. Control of reaction pH has been found to be important for the obtention of "discrete" spheroidal aggregates. When the pH is not controlled to a value within the range of from about 8.5 to about 9.5, it has been found that "continuous", irregular-shaped aggregates are produced Delaying the addition of the Mg solution by 10-15 min. produces smaller aggregates when stirring at high speeds, while a similar delay in adding the sodium aluminate solution results in larger aggregates. Using a greater excess of carbonate ion produces larger aggregates of larger plates. Reducing the temperature at which the reaction is run produces smaller and more irregularly shaped aggregates of smaller plates. Decreasing the final concentration of the reaction produces aggregates with lower bulk density. Adding the solutions over shorter periods of time produces more irregular aggregates of smaller plates.

The wet product is recovered from the reaction solution by decantation of the supernatant solution (mother liquor) and filtration of the wet solids or by filtration of the entire reaction mixture. The product filter cake is washed with water from 2 to 10 times to remove occluded salts in the aggregate. Large aggregates, on the order of >10–15 μm filter very rapidly, producing an incompressible, uncracked wet cake which is highly friable, washes very rapidly and redisperses readily. Smaller aggregates filter more slowly and form compressible, cracked wet cakes which wash slowly. After 10 washings, from 30–40 ppm Na+ ions remain in small (2–7 μm) aggregates and on the order of 200 ppm Na+ ions remain in large (>45 μm) aggregates.

The wet filter cake of product is then dried. Drying can occur at any temperature in the range from room temperature to about 200° C. Bound water corresponding to 4 $H_2O$ per formula unit is reversibly removed at temperatures in the range of from about 200°–300° C. and dehydroxylation of 8 $H_2O$ occurs at temperatures of from about 400°–500° C.

The spheroidal hydrotalcite aggregate produced according to the present invention is composed of irregularly shaped, substantially two-dimensional flat plate-like particles, which have no significantly measurable thickness. From enlarged SEM microphotographic measurements, the plates are typically on the order of less than about 0.05 μm in thickness. Measured plate diameters are the longest measurable linear dimension of a plate surface.

Measurements of the average spherical diameter of the spheroidal hydrotalcite aggregate, as reported herein, were determined using a Coulter LS 130 particle size analyser. All individual plate measurements reported herein were determined from enlarged SEM photomicrographs taken at a magnification of from 500 to 10,000 times.

Typical x-ray powder diffraction data for spheroidal hydrotalcite produced according to the present invention is the same as that of naturally occurring hydrotalcite, with spacing values as follows:

| d-spacing (Å)[1] | Relative Intensity (%) |
| --- | --- |
| 7.80–7.93 | 100 |
| 2.85–3.95 | 38–45 |
| 2.58–2.62 | 20–40 |
| 2.29–2.33 | 21–28 |
| 1.94–1.99 | 16–28 |
| 1.52–1.54 | 10–14 |
| 1.49–1.51 | 12–15 |

[1] Range of data based on five samples.

The hydrotalcite product of this invention is very bright (L=98.5–100) and blue-white (b=0.8–1.7). Color values were determined on a LabScan II instrument.

The hydrotalcite product produced according to the present invention as discussed herein, regardless of aggregate size, demonstrates exceptionally low abrasion values according to the Einlehner method, on the order of from about 0.3 to about 0.6 mg/174k revolutions.

Other physical properties of the product are:

Tapped density (902 taps Englesman Tap Pak Volumeter): 0.17–0.55 g/ml;

He pycnometer density: 1.58–1.8 g/ml;

Surface area (single point BET method): 20–100 $m^2/g$;

Pore volume: (by water absorption method based on ASTM D 1483-84, Standard Test Method for Oil Absorption of Pigment by Gardner-Coleman Method, substituting water for linseed oil) 1.6–4.0 g $H_2O/g$:

Solubility: <6 ppm Mg at pH >7; rapid dissolution at pH <3.

Cross sectional Scanning Electron Microscope (SEM) photographs show the internal structure of the aggregates consists of a porous network of interconnected plates having a wide variation in density and a tendency to form an outwardly radiating pattern.

EXAMPLES

The nature of the present invention may be more readily understood from the following examples. These examples are not intended to be limiting of the scope of the invention, which is determined by the claims. The examples illustrate the preparation of representative forms of hydrotalcite having different aggregate size properties determined by the choice of reaction parameters.

Example 1

Delayed addition of magnesium solution while stirring at high speed produces smaller aggregates.

The reaction was conducted in an 8-liter stainless steel beaker fitted with two 1.25 in. wide baffles and a 3.25 in. Cowles stir blade positioned about 1 in. from the flat bottom of the vessel. A heel of 3.50 liters of deionized (DI) water was heated in the beaker to 80° C. and maintained at that temperature throughout the subsequent addition of solutions. Three 500 ml. solutions containing: (1) 203 g $MgCl_2.6H_2O$ (Mallincrodt AR Grade, 1 mole), (2) 36.3 g $Na_2O.Al_2O_3.3H_2O$ (EM Science, Granular, Technical Grade, 0.166 mole) and (3) 153.5 g $Na_2CO_3$ (Technical Grade, 1.45 mole, 8.7-fold excess) were then added simultaneously to the heel at 4.2 ml/min. with stirring at 3000 rpm. After 2 min. the addition of $MgCl_2$ solution was stopped for 10 min., then resumed. After the additions were completed (in 2.5 hours), the mixture (2 wt. % slurry product solids) was heated and stirred for 10 min., then filtered and washed with four 250 ml portions of DI water.

The pH of the mother liquor was 9.07. A stiff wet cake in an amount of 296 g, was isolated. The cake had a 32 wt. % solids content for a 94.7 g dry yield (95%).

The cake was dried at 110° C. and the dried product was screened through a 325 mesh.

The spheroidal aggregates had an average spherical diameter of 2.3 μm, and were composed of 0.1 to 0.6 μm diameter individual plates. The tapped density of the dried (110° C.) and screened (325 mesh) powder was 0.293 g/ml. The surface area was 94.93 $m^2/g$. The pore volume was 2.88 g $H_2O/g$. X-ray powder diffraction indicated the material was pure hydrotalcite.

X-ray powder diffraction data for the product of Example 1 was as follows:

| d-spacing (Å) | Relative Intensity (%) |
| --- | --- |
| 7.876 | 100 |
| 3.918 | 44 |
| 2.609 | 32 |
| 2.324 | 26 |
| 1.974 | 16 |
| 1.533 | 13 |
| 1.505 | 14 |

Example 2

Stirring at high speed with no delays in addition produces a larger aggregate than with a delay but a smaller aggregate than with slow stirring.

The procedure of Example 1 was used except that no delay in adding the $MgCl_2$ solution was used. A stiff wet cake, in an amount of 320.9 g, was isolated. The cake had a 28.8 wt. % solids content for a 92.4 g dry yield (92%). The spheroidal aggregate product had an average spherical diameter of 6.9 μm, and was composed of 0.1 to 0.8 μm diameter individual plates. The tapped density was 0.26 g/ml, the surface area was 54.04 m2/g, and the pore volume was 2.17 g $H_2O$/g. X-ray powder diffraction indicated the material was pure hydrotalcite.

X-ray powder diffraction data for the product of Example 2 was as follows:

| d-spacing (Å) | Relative Intensity (%) |
| --- | --- |
| 7.929 | 100 |
| 3.942 | 44 |
| 2.615 | 33 |
| 2.327 | 24 |
| 1.981 | 20 |
| 1.536 | 12 |
| 1.508 | 15 |

Example 3

Slow stirring in the presence of a large excess of carbonate produces larger aggregates of larger plates.

The reaction was carried out in a 4 liter glass kettle fitted with a lid and a 6.5 cm diameter three blade propeller stirrer. A 0.760 liter heel of DI water was heated in the reactor to 80° C. with stirring at 400 rpm. Three 0.163 liter solutions were added simultaneously at 1.3 ml/min. The solutions contained: (1) 50.83 g $MgCl_2.6H_2O$ (Mallincrodt, AR Grade, 0.25 mole), (2) 9.08 g $Na_2O.Al_2O_3.3H_2O$ (EM Science, Technical Grade, 0.042 mole) and (3) 39.75 g $Na_2CO_3$ (Baker technical grade, 0.375 mole, 9-fold excess). The addition was complete in 2 hours. The mixture (2 wt. % slurry product solids) was heated and stirred 30 min. then cooled, filtered and the solids washed four times with 200 ml portions of DI water.

The pH of the mother liquor was 8.76. A soft, friable wet cake, in an amount of 65.37 g was isolated. The cake was 36.4 wt. % solids, for a 23.8 g dry yield (94%). The spheroidal aggregate product had an average spherical diameter of 36.1 μm, and was composed of 0.2 to 2.0 μm diameter individual plates. The tapped density was 0.316 g/ml, the surface area was 46.41 m²/g and the pore volume was 2.25 g $H_2O$/g.

Example 4

A smaller excess of carbonate results in smaller aggregates of smaller plates.

The reaction was carried out in the same apparatus as was used in Example (3). A 0.875 liter heel of DI water was heated in the reactor to 80° C. with stirring at 400 rpm. Three 0.125 liter solutions were added simultaneously at 1 ml/min. The solutions contained: (1) 50.83 g $MgCl_2.6H_2O$ (Mallincrodt, AR Grade, 0.25 mole), (2) 18.18 g Sodalum 235 (ALCOA-Coastal Chemicals, 23.4% $Al_2O_3$, 19.9% $Na_2O$, 0.0417 mole $Al_2O_3$, 0.117 mole NaOH) and (3) 13.32 g NaOH (Fisher, Certified ACS Grade, 0.333 mole) plus 13.92 g $NaHCO_3$ (Mallincrodt, AR Grade, 0.166 mole, 4-fold excess). The addition was complete in 2 hours. The mixture (2 wt. % slurry product solids) was heated and stirred 15 min. then cooled, filtered and the solids washed four times with 200 ml portions of DI water.

The pH of the mother liquor was 8.85. A soft, friable wet cake, in an amount of 71.14 g, was isolated. The cake was 35.6 wt. % solids, for a 25.3 g dry yield (100%). The spheroidal aggregate product had an average spherical diameter of 23.6 μm, and was composed of 0.2 to 1.5 μm diameter individual plates. The tapped density was 0.26 g/ml, the surface area was 59.35 m=/g and the pore volume was 2.79 g $H_2O$/g.

Example 5

Higher temperature produces larger aggregates of larger plates with lower tapped density.

The reaction was carried out in the same apparatus as was used in Example (3). A 0.625 liter heel of DI water was heated in the reactor to 100° C. with stirring at 400 rpm. Three 0.125 liter solutions were added simultaneously at 1 ml/min. The solutions contained: (1) 40.3 g $MgCl_2.6H_2O$ (Mallincrodt, AR Grade, 0.2 mole), (2) 7.24 g $Na_2O.Al_2O_3.3H_2O$ (Fisher, Purified Grade, 0.033 mole) and (3) 30.4 g $Na_2CO_3$ (Fisher, AR Grade, 0.29 mole, 8.7-fold excess). The addition took 2 hrs. The mixture (2 wt. % slurry product solids) was stirred and heated for 30 more min., then filtered and washed with four 250 ml portions of DI water.

The pH of the mother liquor was 9.2. A soft, friable wet cake, in an amount of 73.26 g, was isolated. The cake was 26.3 wt. % solids, for a 19.3 g dry yield (97%). The product had an average spheroidal aggregate diameter of 40.1 μm, and was composed of 0.2 to 2.5 μm diameter individual plates. The tapped density was 0.219 g/ml, the surface area was 30.6 m²/g and the pore volume was 3.8 g $H_2O$/g.

Example 6

Higher final slurry solids produces aggregates with higher tapped density and lower pore volume.

The reaction was carried out in the same apparatus as was used in Example (3). A 0.28 liter heel of DI water was heated in the reactor to 100° C. with stirring at 400 rpm. Three 0.24 liter solutions were added simultaneously at 2 ml/min. The solutions contained: (1) 81.3 g $MgCl_2.6H_2O$ (Mallincrodt, AR Grade, 0.4 mole), (2) 28.62 g Sodalum 235 (Alcoa-Coastal Chemicals, 0.066 mole $Al_2O_3$ and 0.182 mole NaOH) and (3) 58.5 g $Na_2CO_3$ (Fisher, lab Grade, 0.55 mole, 8-fold excess). The addition took 2 hrs. The mixture (4 wt. % slurry product solids) was stirred and heated for 45 more min., then filtered and washed with four 250 ml portions of DI water.

The pH of the mother liquor was 9.20. A soft, friable wet cake, in an amount of 84.9 g, was isolated. The cake was 46.4 wt. % solids for a 39.4 g dry yield (98.5%). The spheroidal aggregate product had an average spherical diameter of 35 μm, and was composed of 0.2 to 2.5 μm diameter individual plates. The tapped density was 0.425 g/ml, the surface area was 34.44m$^2$/g and the pore volume was 2.2 g H$_2$O/g.

Example 7

Longer addition time produces aggregates of larger plates.

The reaction was carried out in the same apparatus as was used in Example (3). A 0.34 liter heel of DI water was heated in the reactor to 100° C. with stirring at 400 rpm. Three 0.26 liter solutions were added simultaneously at about 1 ml/min. The solutions contained: (1) 89.5 g MgCl$_2$.6H$_2$O (Mallincrodt, AR Grade, 0.44 mole), (2) 31.6 g Sodalum 235 (ALCOA-Coastal Chemicals, 0.073 mole Al$_2$O$_3$ and 0.20 mole NaOH) and (3) 63.9 g Na$_2$CO$_3$ (Fisher, Lab Grade, 0.60 mole, 8-fold excess). The addition took 4 hrs. The mixture (4 wt. % slurry product solids) was stirred and heated for 20 more min., then filtered and washed with four 250 ml portions of DI water.

The pH of the mother liquor was 9.15. A soft, friable wet cake, in an amount of 109.2 g was isolated. The cake was 40.2 wt. % solids, for a 43.9 g dry yield (99.5%). The spheroidal aggregate product had an average spherical diameter of 42.7 μm, and was composed of 0.4 to 5.0 μm diameter individual plates. The tapped density was 0.339 g/ml, the surface area was 29.73 m$^2$/g, and the pore volume was 2.9 g H$_2$O/g.

Example 8

Very low shear but thorough stirring produces the largest aggregate sizes.

The reaction was conducted in a 2 liter glass kettle fitted with a lid, a heating mantle, a thermocouple thermometer, inlets for three solutions and a stirrer consisting of a flat metal blade, 7.5 wide by 2.5 cm high, attached to the end of a shaft. A 0.16 heel liter of DI water was heated in this apparatus to 95° C. with stirring at 174 rpm. Three 0.303 liter solutions were added simultaneously at 1.3 ml/min. The solutions contained: (1) 89.1 g MgCl$_2$.6H$_2$O (0.438 mole, 6 equiv.), (2) 31.6 g Sodalum 235 (23.6% Al$_2$O$_3$, 0.073 mole, i equiv. and 19.7% Na$_2$O, 0.20 mole NaOH, 2.74 equiv.) and (3) 64.2 g Na$_2$CO$_3$ (0.606 mole, 8.3 equiv.). The addition was complete in 4 hours 15 minutes. The mixture (4 wt. % slurry product solids) was heated and stirred 10 minutes then cooled, filtered and the solids washed five times with 80 ml portions of DI water.

The pH of the mother liquor was 9.3. A soft, friable wet cake, in an amount of 143.5 g, was isolated. The cake was 30.4 wt. % solids for a 43.6 g dry yield (98.9%). The product had an average spheroidal aggregate diameter of 47.5 μm, and was composed of 1.3 to 2.0 μm diameter individual plates. The tapped density was 0.257 g/ml, the surface area was 59.2 m$^2$/g and the pore volume was 3.85 g H$_2$O/g.

Example 9

Reaction scale-up to produce small aggregates.

The reaction was conducted in a 30 liter stainless steel, jacketed, baffled, cylindrical reactor having an internal diameter of 29 cm, a height of 46 cm and a conical bottom about 4 cm deep, equipped with a high speed agitator having two 15 cm diameter flat-blade turbine impellers positioned about 2.5 and 13 cm above the bottom of the straight side of the reactor and driven by a 1.5 horsepower continuous duty motor. Solutions were introduced through the top of the reactor via Tygon tubes spaced about 4 cm apart.

A 14 liter heel of DI water was heated to 80° C. in the reactor. Three 2 liter solutions were prepared using DI water containing: (1) 813 g MgCl$_2$.6H$_2$O (Mallincrodt AR GRADE, 4.0 moles), (2) 288 g of Sodalum 235 solution (ALCOA Coastal Chemicals, 23.6% Al$_2$O$_3$, 19.7% Na$_2$O, 0.667 moles Al$_2$O$_3$, 1.84 moles NaOH) and (3) 331 g Na$_2$CO$_3$.H$_2$O (Fisher, Laboratory Grade, 2.67 moles, 4-fold excess) and 227 g of 50% NaOH solution (Fisher, 2.84 moles). With stirring at 1400 rpm, the sodium aluminate and base solutions were added at 16.7 ml/min. After 10 min. the MgCl$_2$ solution was added at the same rate. The additions were completed after about 105 min. The reaction mixture (2 wt. % slurry product solids) was kept at 80° C. and stirred for 10 more min., cooled, filtered and the solids were washed three times with I liter portions of DI water.

The pH of the mother liquor was 9.12. A stiff wet cake, in an amount of 1078 g, was isolated. The cake was 36.5 wt % solids, for a 394 g dry yield (98%). The spheroidal aggregate product had an average spherical diameter of 1.3 μm, and was composed of 0.1 to 0.3 μm diameter individual plates. The tapped density was 0.29 g/ml, the surface area was 76 71 m$^2$/g and the pore volume was 2.64 g H$_2$O/g.

Example 10

Reaction scale-up to produce large aggregates.

The reaction was conducted in the same apparatus as Example (9). A 10 liter heel of DI water was heated to 95° C. and stirred at 100 rpm. Three solutions were prepared using DI water, containing: (1) 2033 g MgCl$_2$.6H$_2$O (BCL, 10.0 moles) in 4 liters total volume, (2) 662.5 g Sodalum 255 (ALCOA-Coastal Chemical, 25.7% Al$_2$O$_3$, 19.8% Na$_2$O, 1.67 moles Al$_2$O$_3$, 4.24 moles NaOH) in 4 liters total volume and (3) 8.16 liters 2.0M Na$_2$CO$_3$.H$_2$O (FMC, Grade 100, 16.3 moles, 9.8-fold excess). Solutions 1 and 2 were added simultaneously at 11.1 ml/min. Addition of solution 3 was controlled by a pH control loop in which a small portion of the reaction slurry is continuously pumped out of the reactor, passed through a cooling coil and past a pH electrode, then returned to the reaction. The pH measured in this way was used to control the speed of the pump for solution 3 so as to maintain a pH of 9.0. The addition was complete after 6 hrs. The mixture (4 wt. % slurry product solids) was cooled, filtered and the solids were washed twice with 2 liter portions of DI water.

The pH of the mother liquor was 9.0. A soft, friable wet cake, in an amount of 3580 g, was isolated. The cake was 27.0 wt. % solids, for a 967 g dry yield (96%). The spheroidal aggregate product had an average spherical diameter of 50.1 μm, and was composed of 0.4 to 4.0 μm diameter individual plates. The tapped density was 0.27 g/ml, the surface areas was 40.4 m$^2$/g and the pore volume was 3.9 g H$_2$O/g.

Example 11

Utilizing magnesium sulfate and aluminum sulfate as starting materials.

The reaction was carried out in the same apparatus as was used in Example (3). A 1.46 liter heel of DI water was heated in the reactor to 100° C. with stirring at 400 rpm. Two 0.170 liter solutions were added simultaneously at 0.4 ml/min. The solutions contained: (1) 18.9 g Al$_2$(SO$_4$)$_3$16H$_2$O (reagent grade, 0.030 mole) and 44.4 g $MgSO_4 7H_2O$ (reagent grade, 0.18 mole) and (2) 13.5 g $Na_2CO_3$ (0.128 mole, 4-fold excess) and 15.3 g NaOH (0.383 mole). The addition was completed in about 7 hrs. The mixture (product concentration 1 wt %) was heated and stirred 12 hrs., then cooled, filtered and the solids washed four times with 250 ml portions of DI water.

The pH of the mother liquor was 9.14. A soft, friable wet cake, in an amount of 61.08 g was isolated. The cake was 29.5 wt. % solids, for a 18.0 g dry yield (99.4%). The spheroidal aggregate product had an average spherical diameter of 35.4 $\mu$m, and was composed of 0.2 to 1.5 $\mu$m diameter individual plates. The tapped density was 0.20 g/ml, the surface area was 45.7 $m^2/g$ and the pore volume was 3.7g $H_2O/g$.

Example 12

Utilizing magnesium nitrate and aluminum nitrate as starting materials.

The reaction was carried out in the same apparatus as was used in Example (3). 1.56 liter of DI water was heated in the reactor to 100° C. with stirring at 400 rpm. Two 0.170 liter solutions were added simultaneously at 1.5 ml/min. The solutions contained: (1) 23.4 g $Al(NO_3)_3 9H_2O$ (reagent grade, 0.0625 mole) and 48.1 g $Mg(NO_3)_2.6H_2O$ (reagent grade, 0.188 mole) and (2) 13.5 g $Na_2CO_3$ (0.128 mole, 4-fold excess) and 15.3 NaOH (0.383 mole). The addition was completed in 2 hrs. 5 min. The mixture (product concentration 1 wt. %) was heated and stirred 30 min. then cooled, filtered and the solids washed four times with 250 ml portions of DI water.

The pH of the mother liquor was 8.76. A soft, friable wet cake, in an amount of 71.04 g, was isolated. The cake was 25.7 wt. % solids, for an 18.3 g dry yield (96.6%). The spheroidal aggregate product had an average spherical diameter of 21.1 $\mu$m, and was composed of 0.2 to 2.0 $\mu$m diameter individual plates. The tapped density was 0.22 g/l, the surface area was 71.26 $m^2/g$ and the pore volume was 3.28 g $H_2O/g$.

Example 13

Utilizing a reactant solution with an Mg:Al ratio of 4.0:1.

The reaction was carried out in the same apparatus as was used in Examples (3). A heel of 1.43 liters of DI water was heated in the reactor to 80° C. with stirring at 400 rpm. Three 0.190 liter solutions were added simultaneously at about 1.6 ml/min. The solutions contained: (1) 90.5 g $MgCl_2.6H_2O$ (0.445 mole), (2) 24.03 g Sodalum 235 (ALCOA-Coastal Chemicals, 23.6% $Al_2O_3$, 19.7% $Na_2O$, 0.0556 mole $Al_2O_3$, 0.153 mole NaOH) and (3) 33.6 g $Na_2CO_3$ (0.317 mole) plus 13.5 g NaOH (0.337 mole). The addition was complete in 2 hours 10 min. The mixture (2 wt. % slurry product solids) was heated and stirred 20 min., then filtered, and the solids washed four times with 200 ml portions of DI water.

The pH of the mother liquor was 9.1. A soft, friable wet cake weighing 117.4 g was isolated. It was 32.3 wt. % solids, for a 37.9 g dry yield (94.8%). The spheroidal aggregate product had an average spherical diameter of 22.6 $\mu$m, and was composed of 0.2 to 1.1 $\mu$m diameter individual plates. The tapped density was 0.218 g/ml, the surface area was 68.28 $m^2/g$ and the pore volume was 3.72 g $H_2O/g$.

Example 14

Utilizing a reactant solution with an Mg:Al ratio of 2.5:1.

The reaction was carried out in the same apparatus as was used in Example (3). A heel of 1.43 liters of DI water was heated in the reactor to 80° C. with stirring at 400 rpm. Three 0.190 liter solutions were added simultaneously at about 1.6 ml/min. The solutions contained: (1) 76.0 g $MgCl_2.6H_2O$ (0.374 mole), (2) 32.33 g Sodalum 235 (ALCOA-Coastal Chemicals, 23.6% $AlaO_3$, 19.7% $Na_2O$, 0.0748 mole $Al_2O_3$, 0.205 mole NaOH) and (3) 24.6 g $Na_2CO_3$ (0.232 mole) plus 9.87 g NaOH (0.247 mole). The addition was complete in 2 hours 10 min. The mixture (2 wt. % slurry product solids) was heated and stirred 20 min., then filtered, and the solids washed four times with 250 ml portions of DI water.

The pH of the mother liquor was 8.84. A soft, friable wet cake weighing 108.1 g was isolated. It was 36.7 wt. % solids for a 39.7 g dry yield (99.3%). The spheroidal aggregate product had an average spherical diameter of 28.5 $\mu$m, and was composed of 0.2 to 2.0 $\mu$m diameter individual plates. The tapped density was 0.292 g/ml, the surface area was 56.36 m=/g and the pore volume was 3.13 g $H_2O/g$.

Example 15

Increased concentrations of reactant solutions.

The reaction was carried out in the same apparatus as was used in Example (3). A heel of 0.125 liters of DI water was heated in the reator to 80° C. with stirring at 400 rpm. Three solutions were added simultaneously over a period of 4 hours. The solutions were: (1) 89.05 g $MgCl_2.6H_2O$ (0.438 mole) dissolved in DI HaO to a volume of 0.10 liter, (2) 31.6 g (20.8 ml) Sodalum 235 (ALCOA-Coastal Chemicals, 23.6% $Al_2O_3$, 19.7 % $Na_2O$, 0.073 mole $Al_2O_3$, 0.20 mole NaOH) used without dilution and (3) 64.2 g $Na_2CO_3$ (0.606 mole) dissolved in DI $H_2O$ to a volume of 0.303 liter. The mixture (8 wt. % slurry product solids) was heated and stirred 10 min. then filtered and the solids washed five times with 100 ml portions of DI water.

The pH of the mother liquor was 9.1. A soft, friable wet cake weighing 110.9 g was isolated. It was 39.2 wt. % solids for a 43.5 g dry yield (98.9%). The spheroidal aggregate product had an average spherical diameter of 36.4 $\mu$m, and was composed of 0.5 to 1.0 $\mu$m diameter individual plates. The tapped density was 0.344 g/ml, the surface area was 59.71 $m^2/g$ and the pore volume was 2.68 g $H_2O/g$.

Example 16

Utilization of spheroidally aggregated platy synthetic hydrotalcite as a sheen reducer in paint.

Low sheen is important for good touch-up performance in flat paint. Addition of spheroidally aggregated platy synthetic hydrotalcite to a paint formulation results in a paint having greatly reduced sheen as compared to a formulation containing Celite 281, heretofore widely used in the art.

A semi-gloss paint formulation containing spheroidal aggregates of platy hydrotalcite was prepared by first forming an initial make-down by adding 54.8 g water, 4.2 g Tamol 731 dispersant, 2.6 g Igepal CO-630 dispersant, 11.1 g ethylene glycol, 1.8 g Natrosol 250 MR cellulosic thickener, 1.2 g Colloids 643 defoamer, 46.8 g R-900 $TiO_2$ pigment and 55.4 g precipitated calcium carbonate pigment with a barrel-shaped morphology and an average particle size of 0.8 micron; to a Cowles type disperser and mixing at 5000 rpm for 10 minutes to disperse the pigments.

The mixture was then let-down by adding 44.6 g of water and 13 g of spheroidally aggregated platy synthetic hydrotalcite of this invention, having an average spheroidal diameter of 31.7 μm, a surface area of 42.6 $m^2/g$, a tapped density of 0.29 g/ml, and a pore volume of 3.6 ml/g; and mixing at 2500 rpm for 5 minutes.

A final let-down of the mixture was performed by adding 169.5 g UCAR 376 (55%) PVA resin, 1.2 g Colloids 643 defoamer and 5.1 g methyl carbitol coalescing aid; and mixing gently in an air mixer for 10 minutes.

A comparison formulation was identically prepared except that 13 g of Celite 281 sheen reducing additive was substituted for the spheroidally aggregated platy synthetic hydrotalcite.

Samples of both formulations were then drawn down onto Leneta Co. Form 1B test surfaces. Testing for sheen (85° over-white sealed gloss) was carried out using a Hunter Lab D 48D gloss meter.

The sample incorporating the spheroidal aggregates of platy synthetic hydrotalcite had a low sheen of 2.0. while the sample incoporating the Celite 281 had a significantly higher sheen of 9.5.

We claim:

1. A sheen reducing paint additive comprising an effective amount to reduce the sheen of a paint of spheroidally aggregated synthetic platy hydrotalcite having an average spherical diameter of up to about 60 μm.

2. A method of reducing the sheen of paint by adding to the paint formulation spheroidally aggregated synthetic platy hydrotalcite in an amount effective to produce said sheen reduction.

* * * * *